(12) United States Patent
Yvon et al.

(10) Patent No.: US 6,586,025 B2
(45) Date of Patent: *Jul. 1, 2003

(54) USE OF KETO ACIDS TO ENHANCE THE FLAVOR OF CHEESE PRODUCTS

(75) Inventors: Mireille Yvon, Rambouillet (FR); Jean-Claude Gripon, Voisins-le-Bretonneux (FR)

(73) Assignee: Institut National de la Recherche Agronomique (INRA), Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/403,591
(22) PCT Filed: Apr. 24, 1998
(86) PCT No.: PCT/FR98/00828
§ 371 (c)(1), (2), (4) Date: Jan. 20, 2000
(87) PCT Pub. No.: WO98/48645
PCT Pub. Date: Nov. 5, 1998

(65) Prior Publication Data
US 2002/0127300 A1 Sep. 12, 2002

(30) Foreign Application Priority Data
Apr. 25, 1997 (FR) .............................. 97 05133

(51) Int. Cl.[7] ................... A23C 19/064; A23C 19/14
(52) U.S. Cl. ................... 426/39; 426/534; 426/536; 426/650

(58) Field of Search .................. 426/34, 36, 39, 426/534, 536, 538, 650, 43

(56) References Cited

U.S. PATENT DOCUMENTS

| | | | | |
|---|---|---|---|---|
| 4,411,991 A | * | 10/1983 | Hirakawa et al. | 435/42 |
| 4,865,991 A | * | 9/1989 | Mathers | 436/20 |
| 4,911,935 A | * | 3/1990 | Fillaud et al. | 426/36 |
| 4,976,975 A | * | 12/1990 | Callanain | 426/36 |
| 5,358,730 A | * | 10/1994 | Dame-Cahagne et al. | 426/573 |

OTHER PUBLICATIONS

Ney, K. H. "Journal Article", Gordian vol. 86 (1/2): p. 9–10, publication year 1986.*

Camazzola, Degradation of free amino acids during cheese ripening. VII. alpha–Ketoglutaric and pyruvic acids in Taleggio cheese(1979)Istituto di Industrie Agrarie, Univ. degli studi, Milan, Italy. vol. 4 (11/12); p. 1525–1535.*

* cited by examiner

*Primary Examiner*—Nina Bhat
(74) *Attorney, Agent, or Firm*—Oblon, Spivak, McClelland, Maier & Neustadt, P.C.

(57) ABSTRACT

Process for enhancing the flavour of a cheese or of a cheese-flavoured food product whose preparation comprises a maturation step in the presence of lactic acid bacteria, characterized in that a preparation additive comprising at least one keto acid chosen from the group consisting of α-ketoglutaric acid, α-ketoisocaproic acid ketoisovaleric acid and phenylpyruvic acid is used to increase the catabolism of the amino acids in the cheese or food product by the said bacteria.

19 Claims, 1 Drawing Sheet

USE OF KETO ACIDS TO ENHANCE THE FLAVOR OF CHEESE PRODUCTS

BACKGROUND OF THE INVENTION

Figure 1:
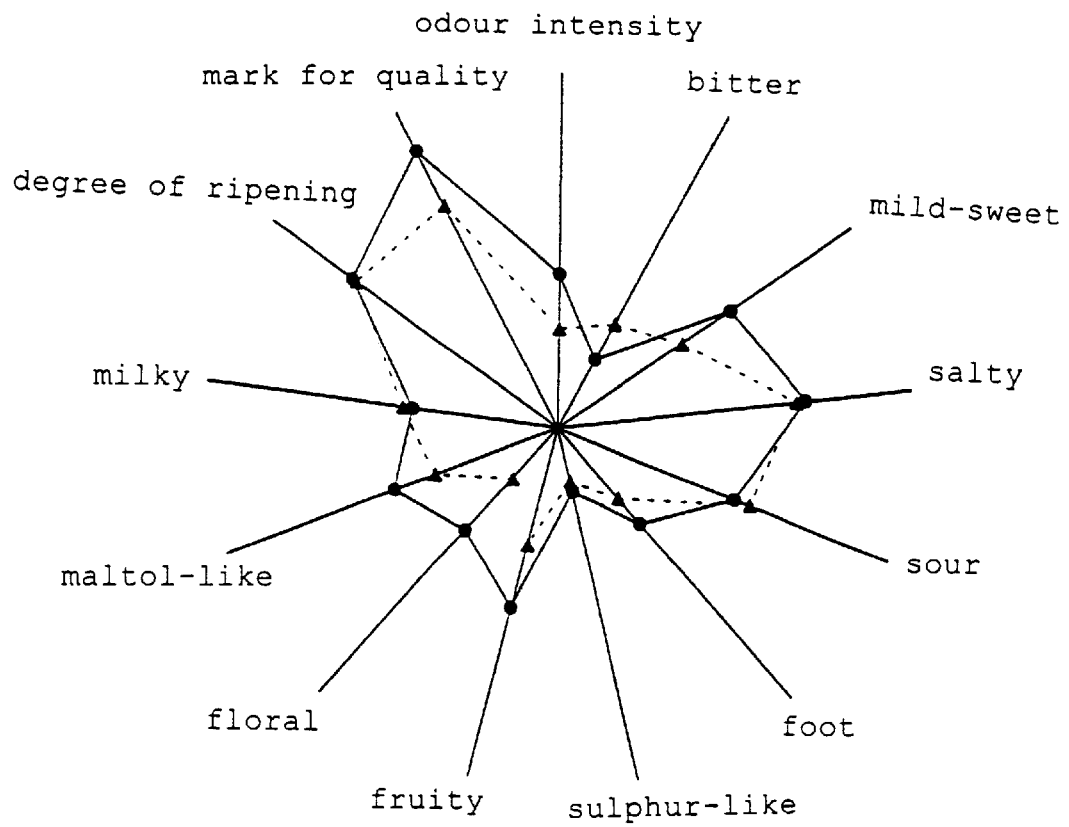

The present invention relates to means for improving the flavour of cheeses and of cheese specialities.

Pressed cheeses without surface flora, which are manufactured essentially with lactococci, have little flavour; its development requires very long ripening times, of the order of 3 to 6 months or even more, for cheeses of the Gouda or Cheddar type, whereas most of these pastes are marketed after considerably shorter ripening times (of the order of a few weeks).

One of the principle objectives of cheese manufacturers is to enhance the flavour of these cheeses, without substantially modifying their manufacturing technology, and without extending the ripening time.

DESCRIPTION OF THE RELATED ART

The enzymatic degradation of amino acids is one of the routes of production of flavour molecules. Indeed, amino acids, and in particular aromatic amino acids, branched amino acids and sulphur-containing amino acids are precursors of flavour compounds of the aldehyde, alcohol, acid or thiol type. Some of these compounds have been identified in cheeses and participate in their flavour [(DUMONT et al., Lait 54:31–43, (1974); MC CUGAN, J. Agric. Food Chem. 23:1047–1050, (1975), GREEN and MANNING, J. Dairy Res. 49:737–748, (19382), NEY and WIROTAMA, Z. Lebensm. -Unters, -Forsch. 146:337–343, (1971)].

It has therefore been proposed to enhance the proteolysis in cheeses so as to increase the quantity of free amino acids. The proteolytic system of lactococci has been widely studied, several peptidases have been purified and characterized and their genes have been cloned and sequenced [LAW and MULHOLLAND, Int. Diary J. 5:833–854, (1995)]. Genetically-modified strains which overexpress these peptidases have been constructed; the use of such strains for the manufacture of "Cheddar" type cheeses was recently described [MC GARRY et al., Appl. Environ. Microbiol. 60:4226–4233, (1994), CHRISTENSEN et al., Int. Dairy J. 5:367–379, (1995)]. However, although the over-expression of peptidases increases the accumulation of the free amino acids, it does not significantly affect the development of flavour. It therefore appears that the factors limiting the development of flavour do not exist at the level of the production of free amino acids, but are also involved in their degradation.

Activities for converting amino acids into flavour compounds nevertheless exist in lactococci. ENGELS and VISSER, [Neth. Milk Dairy J. 50:3–17, (1996)] have shown that flavours typical of Gouda could be generated by incubating cellular extracts of lactococci with methionine. The enzyme assumed to be responsible for this conversion has been purified and characterized; it is a cystathionine β-lyase [ALTING et al., Appl. Environ. Microbiol. 61:4037–4042, (1995)].

It has also been observed that lactococci were capable of degrading in vitro aromatic amino acids and branched amino acids into flavour compounds of the hydroxy acid and acid type. The first step of the degradation of these amino acids is a transamination which requires the presence of an acceptor keto acid [THIROUIN et al., abstr. M4, Club des Bactéries Lactiques (Lactic Acid Bacteria Club)—7th colloquium, Paris, France (1995)]. The transamination is also involved in the degradation of methionine to methanethiol [ALTING et al., Fifth symposium on Lactic acid bacteria: Genetics, metabolism and applications, Veldhoven, The Netherland, Sep. 8–12 1996].

Using a strain of *L. lactis* ssp *cremoris,* the Inventors' team has purified and characterized an amino transferase, and observed that in a simple liquid medium containing glucose, this enzyme could, in the presence of α-ketoglutarate, catalyse the transamination of the three aromatic amino acids (phenylalanine, tryptophan and tyrosine), of leucine and of methionine; this enzyme is active under temperature, pH and ionic strength conditions similar to those encountered during the refining of cheese [YVON et al., Appl. Env. Microbiol., 63, 414–419 (1997)]. The Inventors' team has moreover identified two other aminotransferases which are active on branched amino acids, and which use α-ketoglutarate and, to a lesser degree, oxaloacetate as amino group acceptor. These keto acids may come from the degradation of glutamate or of aspartate, which are always present in cheeses in a large quantity, or they may be synthesized from acetyl-CoA, since the portion of the Krebs cycle between oxaloacetate and α-ketoglutarate appears to be operational in lactococci [LOUBIERE et al., Le Lait 76 (1–2): 5–12, (1996)].

However, the Inventors have observed that in experimental cheeses manufactured with the abovementioned strain of *L. lactis* ssp *cremoris,* the degradation of the aromatic amino acids was in fact very low (2 to 5%) which suggested the existence of factors limiting this degradation in cheeses. Among these limiting factors, the most probable existed at the level of the diffusion of the amino acids and their transport inside the energetically drained bacteria cells (because of the fact that at the time of refining, practically all the sugars which can be used as energy source have already been consumed).

However, the Inventors made the hypothesis that the quantity of acceptor keto acids present in cheese represented the first limiting factor.

To verify this hypothesis, the Inventors have, in the first instance, studied, in simple liquid media, the effect of the addition of simple α-ketoglutarate and of oxaloacetate on the degradation of aromatic and branched amino acids by whole lactococci cells. They have thus observed that the addition of α-ketoglutarate increased the degradation of the aromatic and branched amino acids, and that the addition of oxaloacetate increased that of the branched amino acids. They then sought to confirm this result in cheeses, and observed that in this case, only the addition of α-ketoglutarate had an action on the degradation of the amino acids.

BRIEF DESCRIPTION OF THE INVENTION

The present invention relates to the use of keto acids and in particular of α-ketoglutarate as preparation additive, for enhancing the flavour of a cheese or of a cheese-flavoured food product whose preparation comprises a step of maturation (ripening) in the presence of lactic acid bacteria, and in particular of lactococci. This enhancement of the flavour results from the increase in the catabolism of the amino acids by the said bacteria.

The present invention may be used within the framework of the manufacture of various types of cheese. It is particularly advantageous for the manufacture of pressed cheeses without surface flora, in particular of cheeses with artificial rind. It may also be used within the framework of the manufacture of food products on which it is desired to confer a cheese flavour, among which there may be mentioned in particular food produces in which at least one of the ingredients is obtained from a curd or a milk protein concentrate (casein+whey proteins), such as enzyme-modified cheese bases (<<Enzyme Modified Cheese >>), cheese specialities, processed cheeses, low-fat cheeses.

The subject of the invention is in particular a process for the production of a cheese or of a cheese-flavoured food product, characterized in that a preparation additive comprising at least one keto acid chosen from the group consisting of α-ketoglutarate, and the keto acids which are direct precursors of flavour compounds, such as α-ketoisocaproate, ketoisovalerate, and phenylpyruvate, is used to enhance the flavour of the said product.

DETAILED DESCRIPTION OF THE INVENTION

According to a preferred embodiment of the present invention, the preparation of the said product comprises a maturation step in the presence of at least one lactic acid bacterium belonging to one of the genera Lactococcus, Lactobacillus, Streptococcus and Leuconostoc, and the said additive is added to the said product, prior to the said maturation step or during it.

According to a preferred embodiment of the present invention, the said lactic acid bacterium is chosen from the group consisting of Lactococcus lactis ssp lactis, Lactococcus lactis ssp. cremoris, Lactococcus lactis ssp. diacetylactis, Lactobacllus delbrueckii lactis, Lactobacillus delbrueckii bulgaricus, Lactobacillus plantarum, Lactobacillus helveticus, Lactobacillus paracasei, Streptococcus thermophilus.

When the said additive comprises α-ketoglutarate, the transamination reaction produces, on the one hand, precursors of flavour compounds and, on the other hand, glutamate, which is in fact a taste enhancer. When it comprises keto acids which are direct precursors of flavour compounds, these may, like α-ketoglutarate, play a role of acceptor for the transamination reactions, and may also be directly degraded into various flavour compounds, which makes it possible to obtain different tastes depending on the keto acid(s) chosen.

The quantity of additive which is used may vary according to the degree of flavour enhancement which it is desired to obtain. For example, α-ketoglutarate may generally be used in an amount of 0.5 to 10 mg per gram of non-matured product (non-matured product is understood to mean the drained curd, or the ultrafiltration retentate, in the case of products obtained by ultrafiltration of milk).

To carry out the invention, the said additive may be introduced directly or indirectly into the product during manufacture. The direct introduction may be easily carried out, for example, by soaking the non-matured product or during maturation, in a solution of α-ketoglutarate, or by impregnating the product with a concentrated solution of α-ketoglutarate, before or after salting, or by adding the keto acid(s) to the salt or to the brine used for the salting, or at the time of lactose removal in the case of lactose-free cheeses, or alternatively, in the case of the products obtained by ultrafiltration, by adding to the ultrafiltration retentate.

Advanatageously, when the α-ketoglutarate is introduced into the brine used for the salting, it is added thereto in an amount of 10 to 100 grams per liter of brine.

The indirect introduction may be made by the addition of a strain capable of producing α-ketoglutarate from the glutamate present in cheeses. This may be either a strain of lactococcus or of another lactic acid bacterium, or another refining microorganism, which strain may have been selected or genetically modified.

The subject of the present invention also covers the cheeses capable of being obtained by the process in accordance with the invention.

The present invention will be understood more clearly with the aid of the additional description which follows, which refers to nonlimiting examples showing the influence of the addition of a keto acid on the catabolism of amino acids by lactococci, and of the addition of α-ketoglutarate to cheeses on their organoleptic qualities, and on the degradation of the amino acids in these cheeses.

EXAMPLE 1

Effect of the Addition of α-Ketoglutarate or of Oxaloacetate on the Degradation of Amino Acids by the Cells of Lactococci in Liquid Medium The catabolism of amino acids by lactococcus cells was studied in various media, in the presence or in the absence of keto acids.

Two series of media were used.

A first series is composed of 100 mM Tris/HCl buffer, pH 8 with 2 mM of the non-labelled studied amino acid, and 0.05 μm of the same amino acid which has been tritiated. 10 mM of α-ketoglutarate or of oxaloacetate were added to these basal media.

The second series of media is composed of the same 100 mM Tris/HCl buffer, pH 8, with 2 mM of the non-labelled amino acid and 0.05 μM of the tritiated amino acid, plus 0.3% of glucose. As above, 10 mM of α-ketoglutarate or of oxaloacetate were added to the basal media.

The cells derived from 4 ml of a culture of the strain in a chemically defined medium [SMID and KONINGS, J. Bacteriol, 174:5286–5292, (1990)] are incubated in 0.5 ml of the different media, at 37° C. Aliquots are collected after 10, 20 and 40 hours of incubation, the cells are removed by centrifugation (8000 g, 5 min), and the metabolites are separated by HPLC and identified by comparing their retention time with those of standard compounds. The separation is carried out on a NOVAPACK reversed-phase column (2 mm×150 mm, WATERS) equilibrated with 95% of solvent A (trifluoroacetic acid at 0.115%) and 5% of solvent B (0.1% trifluoroacetic acid, 60% acetonitrile) at a flow rate of 03 ml/min. The metabolites are eluted with a linear gradient of 5 to 20% of solvent B over 35 min. The column is then washed for 5 min with solvent B and then reequilibrated under the initial conditions. The metabolites are detected by UV absorbance at 214 nm and then the eluent (0.3 ml/min) is mixed with the ULTIMA-FLO AP scintillation feed (PACKARD) (0.7 ml/min) for the continuous-flow detection of radioactivity. The standard compounds used are phenylalanine, phenylethylamine, phenylpyruvate, phenylacetaldehyde, phenylethanol, phenylacetate and phenyllactate.

Results

The results are summarized in Table I below, which indicates, for each of the amino acids tested, the quantity of amino acid degraded (as % of the initial quantity), after 10 hours of incubation.

TABLE 1

| Amino acid | Without glucose | | | With glucose | | |
|---|---|---|---|---|---|---|
| | without keto acid | with ketoglutarate | with oxaloacetate | without keto acid | with ketoglutarate | with oxaloacetate |
| Tyrosine | 3 | 46 | — | 10 | 71 | — |
| Phenylalanine | 5 | 40 | 7 | 13 | 62 | 10 |
| Tryptophan | 8 | 58 | — | 19 | 79 | — |
| Leucine | 4 | 60 | 20 | 20 | 80 | — |

These results show that in liquid media not containing ketoglutarate, the degradation of the three aromatic amino acids and of leucine is low. It is close to 5% in 10 hours in the media without glucose and 10 to 20% in the media containing glucose.

The addition of α-ketoglutarate to these media considerably increases the degradation of all these amino acids. In the media without glucose, 40 to 60% of the amino acids are degraded in 10 hours and the degradation reaches 75 to 80% in 40 hours. In the media containing glucose, 60 to 80% of the amino acids are degraded in 10 hours and their degradation is complete after 40 hours.

The addition of oxaloacetate has no effect on the degradation of the aromatic amino acids but substantially increases that of leucine.

The principle metabolites detected are the keto acids corresponding to each amino acid, as well as their degradation products (hydroxy acids and carboxylic acids).

EXAMPLE 2

Effect of the Addition of α-Ketoglutarate to Cheeses on the Degradation of Phenylalanine Manufacture of Uncooked Pressed Cheese with Artificial Rind Five small cheeses of the Saint-Paulin type (250 g) were manufactured from 10 liters of partially skimmed milk (32 g of fat per liter) and pasteurized for 1 min at 750° C. The milk is inoculated at the rate of 2% with an overnight culture of *Lactococcus lactis* (strain NCDO763 of *Lactococcus lactis* ssp *cremoris*) in skimmed milk. The renneting is carried out immediately at 33° C. using 0.03% of rennet (520 mg/l of chymosin, SBI, France). During the stirring, lactose is partially removed from the curd by replacing 30% of the whey with water at 32° C. The curd is then moulded in KADOVA-type moulds and pressed.

Salting and Ripening of the Cheeses

After pressing, one of the cheeses is cut into small cylinders of about 3 g (mini cheeses) for the analysis of the degradation of phenylalanine.

Two brines were used for the mini cheeses intended for the analysis of the degradation of phenylalanine. The first contains 0.1 g of NaCl and 31.25 µCi (0.25 nmol) of tritiated phenylalanine (L-[2,3,4,5,6-$^3$H]phenylalanine) per ml. The second brine contains, in addition to the constituents of the first, 50 mg of α-ketoglutarate per ml. The pH of the two brines is adjusted to 5.7. A mini cheese is immersed in 8 ml of each brine for 1 hour.

After salting, the cheeses are stored in a refrigerator overnight; the next day, they are coated with edible wax and placed in a cellar at 13° C.

Extraction and Analysis of the Products of Degradation of Phenylalanine in the Cheeses After 10 days of ripening, about 1 g of cheese is homogenized in 2.5 ml of citrate buffer (0.2M sodium citrate, pH 2.2, 0.2 g of EDTA and 0.1 ml of pentachlorophenol at 5% per liter). The mixture is filtered on paper and the filtrate is precipitated in the presence of sulphosalicylic acid at a final concentration of 3%. The precipitate is removed by centrifugation (5 min at 18,000 g) and the supernatant is filtered on a 0.45 µm filter. The products of degradation of the phenylalanine are then separated and identified by HPLC as described in Example 1 above.

Results

The HPLC separation profiles obtained after 10 days of ripening at 13° C. show that only 3 to 4% of the labelled phenylalanine was degraded in the control cheese, whereas 17% was degraded in the cheese ripened in the presence of α-ketoglutarate. Phenylpyruvate, as well as its degradation products phenyllactate and phenylacetate were identified among the metabolites formed.

EXAMPLE 3

Effect of the Addition of α-Ketoglutarate to Cheeses on their Organoleptic Quality 250 g cheeses of the Saint-Paulin type are manufactured as described in Example 2 above.

Two of these cheeses are immersed for 3 hours in 2 liters of brine containing 250 g of NaCl per liter and 2 others in 2 liters of brine containing 250 g of NaCl and 50 g of α-ketoglutarate per liter.

Moreover, two other cheeses are each cut into 10 pieces of 25 g. Ten of these pieces are immersed for 2 h 30 min in 0.75 liter of brine containing 100 g of NaCl and the other ten in 0.75 liter of a brine containing 100 g of NaCl and 30 g of α-ketoglutarate per liter.

The pH of all the brines is previously adjusted to 5.7 with lactic acid.

After salting, the cheeses are stored in a refrigerator overnight; the next day, they are coated with edible wax and placed in a cellar at 13° C.

Organoleptic Analyses

These analyses were carried out on 250 g cheeses.

The cheese with α-ketoglutarate and the control cheese were tasted after 14 and 28 days of ripening at 13° C. by a panel of 8 people. 13 characters were scored from 1 to 10 according to their intensity.

The characters evaluated are: the odour intensity, the overall cheese quality, the tastes: salty, sour, mild, sweet and bitter, and the flavour characters: fruity, floral, sulphur-like, maltol-like, milky, and foot. The results obtained for the cheese with α-ketoglutarate and the control cheese were compared by variance analysis.

Results

The results are illustrated by Table II below, which groups together the mean values of the marks given to each character by a panel of 8 people.

FIG. 1 represents the star-shaped profile of the marks given to the control cheese (—▲—) and the cheese with α-ketoglutarate (—●—) after 28 days of ripening.

TABLE II

| Ripening time | 14 days | | 28 days | |
|---|---|---|---|---|
| Character marked | Control | Test | Control | Test |
| Odour intensity | 2.08 ± 0.90 | 2.65 ± 1.95 | 1.68 ± 1.33 | 2.60 ± 1.7 |
| Bitter | 1.66 ± 0.97 | 2.13 ± 1.30 | 2.02 ± 1.27 | 1.33 ± 0.61 |
| Mild-sweet | 2.65 ± 1.41 | 2.31 ± 1.62 | 2.54 ± 1.35 | 3.53 ± 0.90 |
| Salty | 3.62 ± 1.33 | 4.22 ± 1~09 [sic] | 4.05 ± 1.02 | 4.20 ± 0.96 |
| Sour | 2.91 ± 1.49 | 3.68 ± 2.44 | 3.48 ± 2.11 | 3.20 ± 1.49 |
| Foot | 1.08 ± 1.37 | 2.16 ± 1.96 | 1.54 ± 1.53 | 2.11 ± 2.58 |
| Sulphur-like | 0.69 ± 0.56 | 0.94 ± 1.53 | 0.91 ± 0.91 | 1.08 ± 1.03 |
| Fruity | 2.00 ± 1.54 | 1.80 ± 1.11 | 2.02 ± 1.50 | 3.11 ± 1.66 |
| Floral | 0.96 ± 1.20 | 1.87 ± 1.81 | 1.14 ± 0.99 | 2.31 ± 1.99 |
| Maltol-like | 1.65 ± 1.28 | 1.43 ± 1.28 | 2.20 ± 1.74 | 2.94 ± 2.79 |
| Milky | 1.85 ± 2.04 | 1.54 ± 1.20 | 2.65 ± 1.65 | 2.48 ± 1.69 |
| Degree of ripening | 4.62 ± 2.36 | 5.08 ± 2.42 | 4.22 ± 2.37 | 4.31 ± 2.21 |
| Mark for quality | 3.66 ± 2.04 | 2.83 ± 1.54 | 4.20 ± 1.71 | 5.25 ± 1.56 |

After 14 days of ripening, the taste panels noted Little difference between the control cheese and the test. Only the mark for the floral character was significantly higher for the test.

After 28 days of ripening, the marks for the flavour characters: fruity, foot, floral, maltol-like; the odour intensity and the mark for quality are higher for the test. 6 judges out of 8 gave a mark for quality substantially higher for the test and 1 judge did not observe any difference. Overall, the panel emphasized "a more pronounced cheese flavour" and "a highly perfumed cheese" for the cheese with α-ketoglutarate.

It therefore appears that the increase in the degradation of phenylalanine, demonstrated by chemical analysis, impacts on the flavour of the cheeses, since the floral note, which is characteristic of the degradation compounds of aromatic amino acids, is significantly higher in the cheese with ketoglutarate tasted at 14 days.

After 28 days of ripening, the effect of the addition of α-ketoglutarate on the flavour is clearer than after 14 days of ripening. In particular, the odour intensity which is linked to the production of volatile molecules is significantly more intense.

In addition, the overall mark for quality shows that the intensification of the degradation of the amino acids does not generate taste defects but rather improves the organoleptic quality of the cheeses.

Sensory Analysis of the Flavours (Triangular Test).

This analysis was carried out on the 25 g pieces. The ketoglutarate concentration is close to zero for the control cheeses and close to 5 mg per g of cheese for the cheeses brined in the presence of ketoglutarate.

The odour of the cheeses with and without ketoglutarate was compared by a triangular test in which 24 judges participated.

This zest consists in presenting to the judges 3 samples, 2 of one of the cheeses, and 1 of the other cheese.

They are asked:
in a first instance, to indicate which sample is different from the other 2 and which one(s) is (are) the most odorous;
in a second instance, to mark the intensity of the difference perceived on a scale from 1 to 10, and if possible to characterize this difference.

The statistical interpretation consists in calculating the number of correct answers (which recognized the sample different from the other two) and in comparing the value obtained with that presented in the table of the binomial law for a probability of 1 over 3 to know if a significant difference exists.

Results:

The cheese ripened in the presence of ketoglutarate is significantly more odorous than the control cheese, at the 0.1% threshold (the difference was perceived by 18 judges out of 24). The intensity of the difference perceived was marked on average at 3.22/10 and this difference is frequently described as: "a more cheesy odour". Thus, it appears that the addition of ketoglutarate really enhances the development of flavour in the cheeses.

EXAMPLE 4

Effect of the Addition of α-Ketoglutarate to Cheeses on the Degradation of Amino Acids The free amino acids present in the cheeses used in Example 3 were assayed after 14 days of ripening.

Extraction and Analysis of Free Amino Acids

The free amino acids are extracted from the cheeses according to the protocol described for the extraction of the products of degradation of phenylalanine in Example 1. They are then analysed with the aid of an LC3000 automated amino acid analyser (BIOTRONIK) under the conditions recommended by the manufacturer of the apparatus.

Results

Table III below indicates the quantities of each amino acid (in nmol/g of cheese) in the control cheese and in the cheese with ketoglutarate. It also indicates the difference between these quantities, expressed, on the one hand, in nmol/g of cheese, and, on the other hand, in % of the quantity in the control cheese.

TABLE III

| | Quantity of amino acids in nmol/g of cheese | | | |
|---|---|---|---|---|
| | Control | + ketoglu-tarate | Difference (nmol/g) | Difference in % |
| Aspartate | 543 | 511 | −32 | −5.8 |
| Threonine | 562 | 545 | −17 | −3 |
| Serine | 985 | 979 | −6 | −0.6 |
| Asparagine | 2838 | 2808 | −30 | −1 |
| Glutamate | 3275 | 3763 | +488 | +15 |
| Glutamine | 2220 | 2250 | +3 | +0.1 |
| Proline | 1899 | 1906 | +7 | +0.3 |
| Glycine | 396 | 384 | −12 | −3 |
| Alanine | 1144 | 1075 | −69 | −6 |
| Citrulline | 399 | 421 | +21 | +5 |
| Valine | 1730 | 1649 | −81 | −4.6 |
| Methionine | 462 | 413 | −49 | −10.6 |
| Isoleucine | 358 | 322 | −37 | −10.3 |
| Leucine | 4999 | 4514 | −485 | −9.7 |
| Tyrosine | 1062 | 1017 | −46 | −4.3 |
| Phenylalanine | 2919 | 2669 | −250 | −8.6 |
| γ-Aminobutyrate | 1887 | 2870 | +982 | +52 |
| Ornithine | 2354 | 2248 | −106 | −4.5 |
| Lysine | 2327 | 2328 | +1 | +0.04 |

These results show that the quantities of methionine, isoleucine, leucine and phenylalanine in the cheese ripened in the presence of ketoglutarate are about 10% lower than in the control cheese and the quantities of aspartate, alanine, valine, tyrosine and ornithine are about 5% lower. This demonstrates that the addition of α-ketoglutarate to the cheeses greatly intensifies the degradation of the branched acids and of the aromatic amino acids although in this case, the quantity of ketoglutarate incorporated is moderate (about 1 mg/g of drained curd).

Moreover, the quantities of glutamate and of γ-aminobutyrate (which comes from glutamate) are considerably higher in the cheese with ketoglutarate than in the control cheese. This confirms that the ketoglutarate added was indeed used for the transamination reaction and converted to glutamate (which is moreover a taste enhancer).

The other amino acids are in equivalent quantity in both cheeses.

EAXMPLE 5

Effect of the Addition of α-Ketoglutarate to Liquid Reaction Media and to Pseudocurds on the Degradation of the Amino Acids by Various Species of Lactic Acid Bacteria This example demonstrates the influence of the addition of ketoglutarate on the catabolism of the amino acids by lactic acid bacteria other than lactococci. This study was carried out, on the one hard, in liquid media and, on the other hand, in a pseudocurd. The tests in pseudocurds represent an alternative to the tests in real cheeses which, on the one hand, are long and expensive and which, on the other hand, are difficult to carry out with pure strains of lactic acid bacteria other than lactococci. Indeed, in the cheeses, the lactic acid bacteria belonging to the genus Lactobacillus are always associated with lactococci or with streptococci. For example, the *Lactobacillus delbrueckii* and the *Lactobacillus helveticus* are associated with *Streptococcus thermophilus* in cooked pressed cheeses. The Lactobacillus of the *paracasei* or *plantarum* type develop for their part during a fairly long ripening of pressed cheeses manufactured either with lactococci or with streptococci. The latter are in fact called "non starter" lactic acid bacteria unlike the "starter" lactic acid bacteria which are responsible for the acidification. For this study, phenylalanine and leucine, which are the predominant free amino acids in cheeses, were chosen as marker amino acids, respectively for aromatic amino acids and for branched-chain amino acids.

Strains of Lactic Acid Bacteria and Preparation of the Cells.

The lactic acid bacteria chosen belong to the genera Lactobacillus and Streptococcus. They are the species most frequently encountered in dairy technology. *Lactococcus lactis* NCDO 763 serves as "control" in this study.

The seven strains used, which possess the characteristics of strains conventionally used in dairy technology, are obtained from the CNRZ collection (INRA, Jouy-en-Josas). They are: *Lactococcus lactis* ssp. *cremoris* (strain NCDO 763) *Lactobacillus delbrueckii lactis* (strain CNRZ 12) *Lactobacillus delbrueckii bulgaricus* (strain CNRSRZ 752) *Lactobacillus plantarum* (strain CNRZ 1228) *Lactobacillus helveticus* (strain CNRZ 32) *Lactobacllus paracasei* (strain CNRZ 316) *Streptococcus thermophilus* (strain CNRZ 302).

The lactobaccili are cultured in an MRS medium (DIFCO), the streptococcus in an M17 medium (DIFCO) containing 10 g/l of lactose and the lactococcus in M17 medium with glucose. The cultures are incubated at 37° C. except *Lb. paracasei* and *Lb. plantarum* which are cultured at 30° C.

The cells are recovered at the beginning of the stationary growth phase by centrifugation (8000 g, 10 min) and washed twice with 50 mM glycerophosphate buffer, pH 7.

Tests in Liquid Reaction Media.

The basal medium is composed of 100 mM Tris/HCl buffer pH8, with 2 mM of the non-labelled studied amino acid (phenylalanine or leucine) and 0.05 μM of the same amino acid which has been tritiated (126 mCl/μmol) (L-[2, 3,4,5,6-$^3$H]phenylalanine or L-[4,5-$^3$H]leucine), and then 0.3% of glucose. For the tests with ketoglutarate, 10 mM of this compound are added to the basal medium.

The quantity of cells corresponding to an $OD_{480}$ of 10 is introduced into 500 μl of medium and 100 μl aliquots are collected at time 0 and then after 10 h, 20 h and 40 h of incubation at 37° C.

Tests in Pseudocurd.

The degradation of labelled (tritiated) amino acids was also studied in a pseudocurd whose composition is similar to that of a cheese.

This pseudocurd is prepared by mixing 4.5 ml of a solution of calcium phosphocaseinate at 10% sterile (115° C., 10 min) with 20 μl of a 10M solution of calcium chloride and 0.5 ml of a solution of amino acids simulating the free amino acid composition of a 4-week old St Paulin type cheese (cf. Table IV below) and containing 20 μCi of the tritium-labelled amino acid studied. For the tests with ketoglutarate, the latter is added in an amount of 4 mg/ml of medium. These two solutions are sterilized beforehand by filtration.

The cells obtained from a 5 ml culture are added to this mixture just before introducing thereto powdered gluconolactone at a final concentration of 15 g/l. Aliquots of 1 ml are then distributed into sterile tubes with a conical bottom, and 3 μl of rennet diluted ¹⁄₁₀ and sterilized by filtration are finally added. The mixture is incubated at 30° C. until the curd sets and then the tubes are placed in an oven at 130°C. for "ripening" for 2 to 4 weeks.

TABLE IV

|  | in μmol/g | in μg/g |
| --- | --- | --- |
| Aspartate | 0.8 | 110 |
| Threonine | 0.9 | 110 |
| Serine | 1.3 | 140 |
| Asparagine | 2.6 | 340 |
| Glutamate | 5 | 740 |
| Glutamine | 3.2 | 470 |
| Proline | 2.4 | 280 |
| Glycine | 0.5 | 40 |
| Alanine | 1.5 | 130 |
| Valine | 0.5 | 340 |
| Cysteine | 2.9 | 60 |
| Methionine | 1 | 150 |
| Isoleucine | 0.8 | 100 |
| Leucine | 6.4 | 840 |
| Tyrosine | 1.3 | 240 |
| Phenylalanine | 3.7 | 610 |
| Histidine | 0.6 | 90 |
| Lysine | 2.8 | 410 |

Extraction and Monitoring of the Degradation of Amino Acids.

In the liquid reaction media, the cells are removed by centrifugation (8000 g, 5 min) and the supernatants are directly analysed by HPLC with a continuous flow radioactivity detection, as described in example 1. This analysis allows the separation of the amino acid and of the various degradation products. The percentage degradation of the amino acid is estimated by the percentage of radioactivity present in the degradation product elution volume.

For the pseudocurds, the content of each tube (about 1 g) is homogenized with an ULTRA-TURAX in 2.5 ml of citrate buffer (0.2M sodium citrate, pH2.2, 0.2 g of EDTA and 0.1 ml of pentachlorophenol at 5% per liter). The mixture is then centrifuged for 5 min at 8000 g and the supernatant is precipitated in the presence of sulphosalicylic acid at a final concentration of 3%. After 10 min at 0° C., the precipitate is again removed by centrifugation (5 min at 18,000 g) and the supernatant is filtered on a 0.45 μm filter. The products of degradation of the amino acids are then separated, identified and quantified by HDLC as described above.

Results

1. The percentages of degradation of phenylalanine and of leucine in the liquid reaction media containing ketoglutarate or otherwise, after 10 h and 40 h of incubation at 37° C., are presented in Table V.

TABLE V

|  | Phenylalanine | | | | Leucine | | | |
| --- | --- | --- | --- | --- | --- | --- | --- | --- |
|  | without ketoglu-tarate | | with ketoglu-tarate | | without ketoglu-tarate | | with ketoglu-tarate | |
| Strains | 10 h | 40 h | 10 h | 40 h | 10 h | 40 h | 10 h | 40 h |
| Lc.lactis | 7 | 13 | 71 | 98 | 20 | — | 30 | — |
| Lb.d.bulgaricus | 0 | 0 | 14 | 39 | 0 | 0 | 9 | 30 |
| Lb.d.lactis | 0 | 0 | 1 | 3 | 0 | 0 | 10 | 27 |
| Lb.plantarum | 9 | 11 | 38 | 73 | 6 | 10 | 23 | 42 |
| Lb. helveticus | 0 | 0 | 9 | 18 | 0 | 2 | 7 | 25 |
| St. thermophilus | 7 | 15 | 25 | 48 | 9 | 10 | 38 | 67 |
| Lb. paracasei | 29 | 63 | 66 | 99 | 43 | 54 | 80 | 85 |

These results show that for all the strains studied, except Lb. paracasei, the degradation of the amino acids in the media not containing ketoglutarate is low: it remains less than 15% even after 40 hours of incubation at 37° C. The addition of ketoglutarate to the media considerably increases the degradation of the amino acids by all the strains studied. The percentage degradation is at least multiplied by 2. Similar results were obtained in media not containing glucose.

The degradation observed in the absence of ketoglutarate with Lb. paracasei indicates that for this bacterium, either the pyruvate obtained from the degradation of the glucose is an acceptor of the amine group in the transamination reaction, or that there is another route of degradation other than transamination. Nevertheless, with this strain as well, the addition of ketoglutarate substantially intensifies the degradation of the two amino acids tested.

2. The percentages of degradation of phenylalanine and of leucine in the pseudocurds after 2 and 4 weeks of ripening at 13° C. are represented in Table VI.

TABLE VI

|  | Phenylalanine | | | | Leucine | | | |
| --- | --- | --- | --- | --- | --- | --- | --- | --- |
|  | without ketoglu-tarate | | with ketoglu-tarate | | without ketoglu-tarate | | with ketoglu-tarate | |
| Strains | 2 wk | 4 wk | 2 wk | 4 wk | 2 wk | 4 wk | 2 wk | 4 wk |
| Lc.lactis | 3 | 3 | 4 | 6 | 5 | 6 | 8 | 11 |
| Lb.d.bulgaricus | 0 | 0 | 18 | 22 | 1 | 1 | 7 | 10 |
| Lb.d.lactis | 0 | 0 | 11 | 7 | 0 | 0 | 3 | 4 |
| Lb.plantarum | 1 | 2 | 7 | 13 | — | — | — | — |
| Lb. helveticus | 0 | 0 | 6 | 10 | 0 | 0 | 0 | 2 |
| St. thermophilus | 0 | 1 | 2 | 3 | 0 | 0 | 5 | 9 |
| Lb. paracasei | 0 | 0 | 7 | 3 | 0 | 0 | 10 | 10 |

As in the liquid media, for most of the strains of lactic acid bacteria studied, the degradation of the amino acids in the pseudocurds without ketoglutarate is practically zero. On the other hand, in the presence of keroglutarate, all the strains degrade phenylalanine ar,d leucine, and the degradation after 4 weeks varies between 2% and 22% depending on the strains and the amino acid considered. It should be noted that the percentages of degradation observed in these pseudocurds with Lactococcus lactis after 4 weeks are of the same order as those found in the St Paulin type cheeses manufactured with this strain and also ripened 4 weeks in the presence of ketoglutarate (9.8% and 12.8% respectively for phenylalanine and leucine in the cheeses, to be compared with 6% and 11% in the pseudocurds). Consequently, the results obtained with this model may be considered as being representative of what would be observed in cheeses.

What is claimed is:

1. A process for enhancing the flavour of a cheese or of a cheese-flavoured food product whose preparation comprises a maturation step in the presence of lactic acid bacteria, wherein said process comprises:

a) adding to said cheese or cheese-flavoured food product before completion of maturation, at least one keto acid selected from the group consisting of a-ketoglutaric acid, α-ketoisocaproic acid, ketoisovaleric acid and phenylpyruvic acid in an amount sufficient to increase the catabolism by the said bacteria of branched chain amino acids and/or of aromatic amino acids and/or of methionine in said cheese or cheese-flavoured food product and;

b) completing the maturation step.

2. A process according to claim 1, characterized in that the maturation step is carried out in the presence of at least one lactic acid bacterium belonging to one of the genera Lactococcus, Lactobacillus, Streptococcus and Leuconostoc, and in that the keto acid is added to the said product, prior to the said maturation step or during it.

3. A process according to claim 2, characterized in that the said lactic acid bacterium is selected from the group consisting of Lactococcus lactis ssp lactis, Lactococcus lactis ssp. cremoris, Lactococcus lactis ssp. diacetylactis, Lactobacillus deibrueckil lactis, Lactobacillus delbrueckil bulgaricus, Lactobacillus plantarum, Lactobacillus helveticus, Lactobacillus paracasei and Streptococcus thermophius.

4. A process according to claim 3, characterized in that the said keto acid is α-ketoglutaric acid.

5. A process according to claim 3, characterized in that the said keto acid is added in an amount of 0.5 to 10 mg of keto acid per gram of nonmatured product.

6. A process according to claim 1, characterized in that the said keto acid is introduced into the brine used for the salting.

7. A process according to claim 6, characterized in that the said keto acid is added in an amount of 10 to 100 grams of keto acid per liter of brine.

8. A cheese or cheese-flavoured food product, which is obtained by a process according to claim 1.

9. A cheese or cheese-flavoured food product, which is obtained by a process according to claim 2.

10. A process for enhancing the flavour of a cheese or of a cheese-flavoured food product whose preparation comprises a maturation step in the presence of lactic acid bacteria, wherein said process comprises:

a) adding to said cheese or cheese-flavoured food product before completion of maturation, at least one keto acid selected from the group consisting of α-ketoglutaric acid, α-ketoisocaproic acid, ketoisovaleric acid and phenylpyruvic acid in an amount 0.5 to 10 mg of keto acid per gram of nonmatured product and;

b) completing the maturation step.

11. A process according to claim 10, characterized in that the maturation step is carried out in the presence of at least one lactic acid bacterium belonging to one of the genera Lactococcus, Lactobacillus, Streptococcus and Leuconostoc, and in that the keto acid is added to the said product, prior to the said maturation step or during it.

12. A process according to claim 11, characterized in that the said lactic acid bacterium is selected from the group consisting of *Lactococcus lactis* ssp lactis, *Lactococcus lactis* ssp. cremoris, *Lactococcus lactis* ssp. diacetylactis, *Lactobacillus delbrueckii lactis, Lactobacillus delbrueckii bulgaricus, Lactobacillus plantarum, Lactobacillus helveticus, Lactobacillus paracasei and Streptococcus thermophilus.*

13. A process according to claim 12, characterized in that the said keto acid is α-ketoglutaric acid.

14. A cheese or cheese-flavoured food product, which is obtained by a process according to claim 11.

15. A process according to Claim 10, characterized in that the said keto acid is introduced into the brine used for the salting.

16. A process according to claim 15, characterized in that the said keto acid is added in an amount of 10 to 100 grams of keto acid per liter of brine.

17. A process according to claim 16 characterized in that said food product is an unmatured pressed cheese without surface flora.

18. A process according to claim 17 in that said lactic acid bacteriumisa strain of *Lactococcus lactis* ssp. cremoris and that said keto acid is α-ketoglutaric acid.

19. A cheese or cheese-flavoured food product, which is obtained by a process according to claim 10.

* * * * *